(12) United States Patent
Zhang et al.

(10) Patent No.: US 10,726,068 B2
(45) Date of Patent: Jul. 28, 2020

(54) APP PROCESSING METHOD AND APPARATUS

(71) Applicant: TENCENT TECHNOLOGY (SHENZHEN) COMPANY LIMITED, Shenzhen (CN)

(72) Inventors: Xinghua Zhang, Shenzhen (CN); Shengxin Xia, Shenzhen (CN); Huiming Gan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 122 days.

(21) Appl. No.: 16/031,318

(22) Filed: Jul. 10, 2018

(65) Prior Publication Data

US 2018/0373792 A1 Dec. 27, 2018

Related U.S. Application Data

(63) Continuation of application No. PCT/CN2017/071961, filed on Jan. 20, 2017.

(30) Foreign Application Priority Data

Feb. 5, 2016 (CN) .......................... 2016 1 0082191

(51) Int. Cl.
*G06F 16/738* (2019.01)
*H04L 29/06* (2006.01)
(Continued)

(52) U.S. Cl.
CPC ............ *G06F 16/739* (2019.01); *G06F 17/11* (2013.01); *H04L 67/327* (2013.01); *H04L 67/40* (2013.01)

(58) Field of Classification Search
CPC ...... G06F 16/739; G06F 17/11; G06F 16/958; G06F 8/61; G06F 9/452; H04L 67/40; H04L 67/327
See application file for complete search history.

(56) References Cited

U.S. PATENT DOCUMENTS 7,266,616 B1 * 9/2007 Munshi .................. G06T 15/00
709/246
8,151,323 B2 * 4/2012 Harris ..................... H04L 67/06
726/4
(Continued)

FOREIGN PATENT DOCUMENTS

CN 101447888 A 6/2009
CN 102571940 A 7/2012
(Continued)

OTHER PUBLICATIONS

Korean Intellectual Property Office (KIPO) Notification of Reason for Refusal for 10-2018-7009659 dated Mar. 8, 2019 12 Pages (including translation).
(Continued)

*Primary Examiner* — Patrice L Winder
(74) *Attorney, Agent, or Firm* — Anova Law Group, PLLC

(57) ABSTRACT

An app processing method is provided for a terminal. The method includes sending a remote operation request to a server. The remote operation request is used to request to perform a remote operation on a target app to be downloaded on an app platform, and the target app has not been installed. The method also includes receiving program information of the target app returned by the server, where the target app runs on the server in response to the remote operation request, and the target app is installed on the server. The method also includes sending a remote operation instruction to the server based on the program information, where the
(Continued)

Screen of a terminal

Screen of a server remote operation instruction is used to instruct to perform an operation on the target app running on the server. A remote operation result is received, which is a result obtained by performing the operation on the running target app.

16 Claims, 9 Drawing Sheets

(51) Int. Cl.
*G06F 17/11* (2006.01)
*H04L 29/08* (2006.01)

(56) References Cited

U.S. PATENT DOCUMENTS

| | | | | |
|---|---|---|---|---|
| 9,445,154 | B2* | 9/2016 | Baker | H04N 5/2621 |
| 9,965,779 | B2* | 5/2018 | Yeom | G06Q 30/02 |
| 10,080,966 | B2* | 9/2018 | Relan | A63F 13/30 |
| 2007/0108274 | A1* | 5/2007 | Boardman | G06Q 20/123 |
| | | | | 235/383 |
| 2010/0138780 | A1* | 6/2010 | Marano | G06F 9/452 |
| | | | | 715/804 |
| 2011/0078801 | A1* | 3/2011 | Bae | G06F 21/6209 |
| | | | | 726/29 |
| 2013/0219280 | A1* | 8/2013 | Weinstein | H04L 65/1069 |
| | | | | 715/736 |
| 2013/0232485 | A1* | 9/2013 | Murray | G06F 9/45533 |
| | | | | 718/1 |
| 2015/0081764 | A1* | 3/2015 | Zhao | H04L 67/08 |
| | | | | 709/203 |
| 2016/0373537 | A1* | 12/2016 | Lin | H04L 67/18 |
| 2017/0032050 | A1* | 2/2017 | Kol | G06F 17/2264 |
| 2017/0052773 | A1* | 2/2017 | Deselaers | H04L 67/34 |

FOREIGN PATENT DOCUMENTS

| | | |
|---|---|---|
| CN | 102841809 A | 12/2012 |
| CN | 103049315 A | 4/2013 |
| KR | 20070040092 A | 4/2007 |
| KR | 20140052336 A | 5/2014 |

OTHER PUBLICATIONS

The World Intellectual Property Organization (WIPO) International Search Report for PCT/CN2017/071961 dated Mar. 24, 2017 5 Pages (including translation).

* cited by examiner

FIG. 2 (Prior Art)

APP PROCESSING METHOD AND APPARATUS

RELATED APPLICATIONS

This application a continuation application of PCT Patent Application No. PCT/CN2017/071961, filed on Jan. 20, 2017, which claims priority to Chinese Patent Application No. 201610082191.X, entitled "APP PROCESSING METHOD AND APPARATUS" filed on Feb. 5, 2016, content of all of which is incorporated by reference in its entirety.

FIELD OF TECHNOLOGY

The present disclosure relates to the field of Internet and, specifically, relates to an app processing method and apparatus.

BACKGROUND

Currently, when a user downloads an application (or app in short) on an electronic service platform, and when the electronic service platform presents the app to be downloaded by the user, functionalities of the app may be previewed by using a screenshot of the app, a video, or content captured from a third-party app. FIGS. 1-3 respectively show the types of preview of screenshots, video playback, and captured content.

In the preview format shown in FIG. 1, a payment status image and an order status image are used to respectively present a payment function and an order function of the app. By using this preview format, information presented to the user is limited. Moreover, an app developer may provide false preview pictures and descriptions to get a larger number of downloads.

As shown in FIG. 2, a short video is provided to present the function of an app, and a user may play the short video to learn about the functions of the app being presented. However, the user can only have basic knowledge of the functions of the app by using the preview formats of screenshots and video playback, and still needs to download and install the app to practically experience the functions of the app, which can cause the user to consume extra data flow. Moreover, it is relatively expensive to make a video and, therefore, the video preview format is impractical for most apps. Such format is usually used in some high-quality games.

For an interface picture shown in FIG. 3, the entire picture is a picture captured from a third-party app. However, there might be legal issues when pictures are captured from the third-party app to preview the app. But, if the third-party app actively imports functional content, content is not updated in time. Moreover, this format also has limitations, and is only suitable for previewing of content and services but is not applicable to game apps, tool apps, social networking apps, among other apps.

Thus, for the above problems when previewing apps, effective and real information often cannot be provided. The disclosed methods and systems are directed to solve one or more problems set forth above and other problems.

SUMMARY

Embodiments of the present invention provide an app processing method and apparatus, so as to at least resolve the problem that, when a user previews an app, effective and real information cannot be provided.

According to an aspect of the embodiments of the present disclosure, an app processing method is provided for a terminal. The method includes sending a remote operation request to a server. The remote operation request is used to request to perform a remote operation on a target app to be downloaded on an app platform, and the target app has not been installed on the terminal. The method also includes receiving program information of the target app returned by the server, where the target app runs on the server in response to the remote operation request, and the target app is installed on the server. The method also includes sending a remote operation instruction to the server based on the program information, where the remote operation instruction is used to instruct to perform an operation on the target app running on the server. Further, the method includes receiving a remote operation result returned by the server, and the remote operation result is a result obtained by performing the operation on the running target app.

According to another aspect of the embodiments of the present disclosure, an app processing method is provided for a server. The method includes receiving a remote operation request sent by a terminal, where the remote operation request is used to request to perform a remote operation on a target app to be downloaded on an app platform, and the target app has not been installed on the terminal. The method also includes, after running the target app in response to the remote operation request, returning program information of the target app to the terminal, where the target app is installed on the server. Further, the method includes receiving a remote operation instruction sent by the terminal based on the program information, where the remote operation instruction is used to instruct to perform an operation on the target app running on the server; and performing the operation on the running target app to obtain a remote operation result, and returning the remote operation result to the terminal.

According to another aspect of the embodiments of the present disclosure, a terminal is provided. The terminal includes a memory and a processor. The processor is configured to perform: sending a remote operation request to a server, where the remote operation request is used to request to perform a remote operation on a target app to be downloaded on an app platform, and the target app has not been installed on the terminal; receiving program information of the target app returned by the server, where the target app runs on the server in response to the remote operation request, and the target app is installed on the server; sending a remote operation instruction to the server based on the program information, where the remote operation instruction is used to instruct to perform an operation on the target app running on the server; and receiving a remote operation result returned by the server, where the remote operation result is a result obtained by performing the operation on the running target app.

According to another aspect of the embodiments of the present disclosure, a server is provided. The server includes a memory and a processor. The processor is configured to perform: receiving a remote operation request sent by a terminal, where the remote operation request is used to request to perform a remote operation on a target app to be downloaded on an app platform, and the target app has not been installed on the terminal. The processor is also configured to perform, after running the target app in response to the remote operation request, returning program information of the target app to the terminal, where the target app is installed on the server; receiving a remote operation instruction sent by the terminal based on the program information, where the remote operation instruction is used to instruct to perform an operation on the target app running on the server; and performing the operation on the running target app to obtain a remote operation result, and returning the remote operation result to the terminal.

Other aspects of the present disclosure can be understood by those skilled in the art in light of the description, the claims, and the drawings of the present disclosure.

BRIEF DESCRIPTION OF THE DRAWINGS

The accompanying drawings are provided for further understanding of the present disclosure, and constitute a part of the present disclosure, but do not constitute improper limitations to the present disclosure. In the accompanying drawings:

Figure 2:
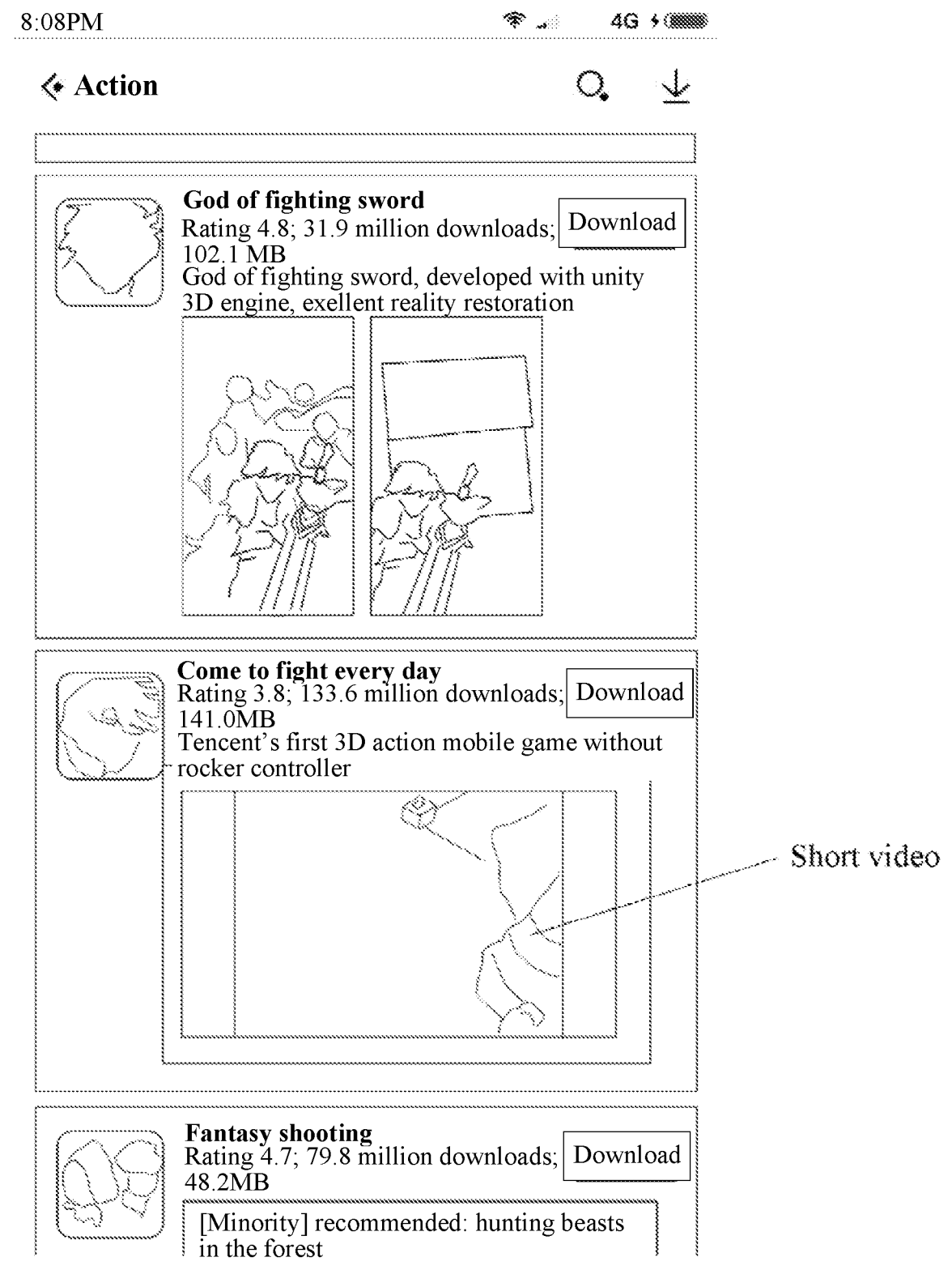

FIG. 2 is another existing interface of previewing an app.

DETAILED DESCRIPTION

To make the solutions of the present disclosure clearer and more comprehensible to persons skilled in the art, the following describes the technical solutions in the embodiments of the present disclosure with reference to the accompanying drawings. Apparently, the described embodiments are some of the embodiments of the present disclosure rather than all of the embodiments. Other embodiments obtained by a person of ordinary skill in the art based on the described embodiments of the present disclosure and without creative efforts shall fall within the protection scope of the present disclosure.

It should be noted that the terms "first" and "second" in the specification, the claims, and the accompanying drawings of the present disclosure are used only to differentiate similar objects, and do not describe a specific relationship or sequence between. It is to be understood that the terms so used are interchangeable under appropriate circumstances such that the embodiments of the present disclosure described herein can be implemented in sequences other than those illustrated or otherwise described herein. Moreover, the terms "include", "comprise", and any variants thereof are intended to cover a non-exclusive inclusion, such that a process, method, system, product, or device that includes a series of steps or units is not necessarily limited to those steps and units expressly listed, but may include other steps or units not expressly listed or inherent to such process, method, product, or device.

According to the embodiment of the present disclosure, an app processing method is provided. It should be noted that the steps illustrated in the flow charts in the accompanying drawings can be carried out in a computer system in which a group of computers can execute instructions. Although the logical order of the steps is shown in the flow charts, the illustrated or described steps may be carried out in a different order in some cases.

Figure 1:
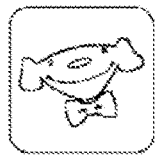
FIG. 1 is an existing interface of previewing an app.
Figure 3:
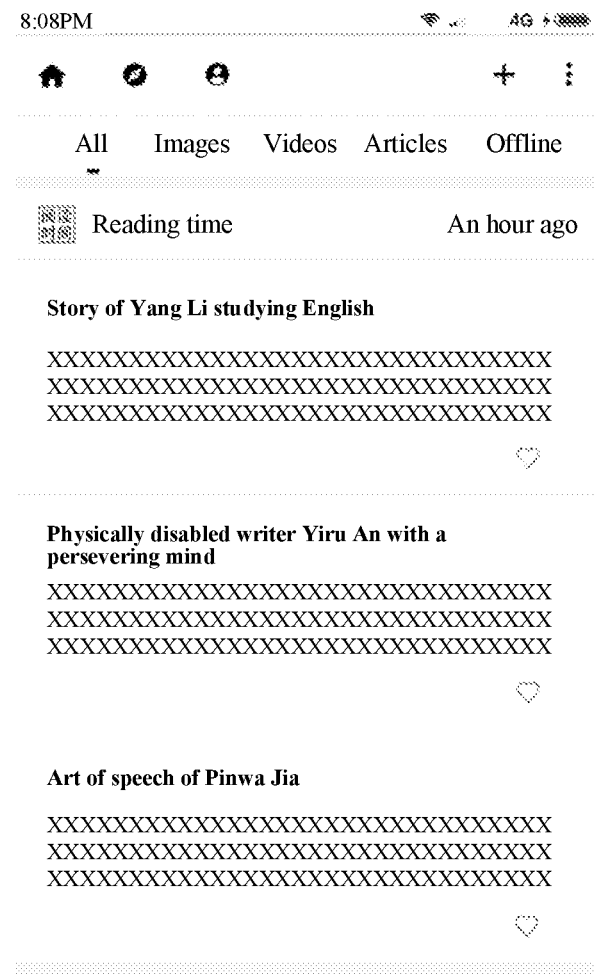
FIG. 3 is another existing interface of previewing an app.
Figure 4:
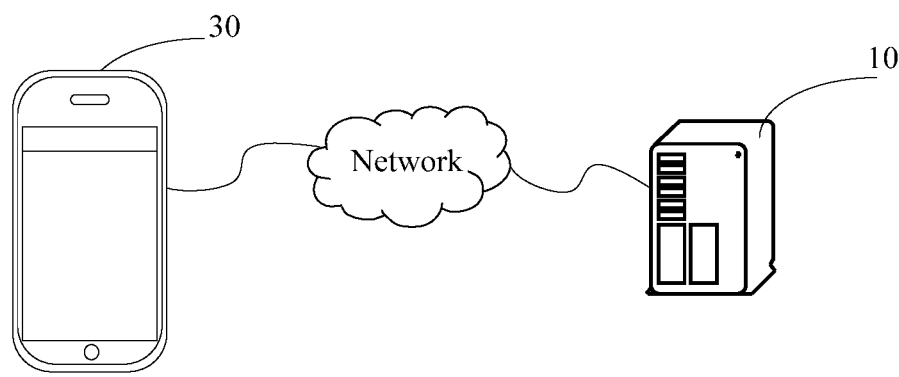
FIG. 4 is a diagram of a network environment according to an embodiment of the present disclosure.

In one embodiment, the described app processing method may be applied to a hardware environment including a terminal 30 and a server 10, as shown in FIG. 4. The server establishes a connection to the terminal by using a network. A processor configured to perform an operation may be disposed on both the terminal and the server.

As shown in FIG. 4, the server connects to the terminal by using a wireless network (for example, establishes a connection by using a WiFi module) or a wired network. The network includes, but is not limited to: a wide area network, a metropolitan area network or a local area network. The terminal in one embodiment may be a personal computer or a mobile terminal, for example, a smartphone, a tablet computer, a personal digital assistant (PDA) or another handheld device.

Figure 5:
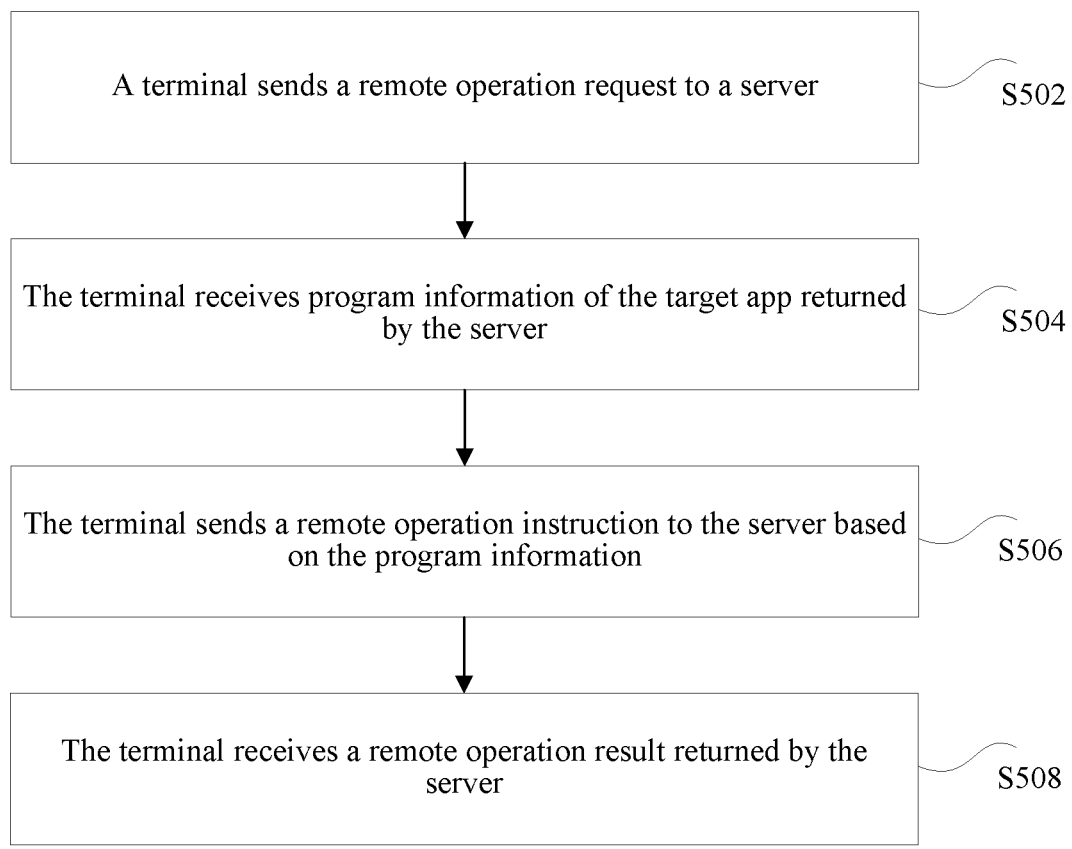
FIG. 5 is a flowchart of an app processing method according to an embodiment of the present disclosure.

In the operating environment, an app processing method shown in FIG. 5 may be implemented by using the followings.

S502: A terminal sends a remote operation request to a server, where the remote operation request is used to request to perform a remote operation on a target app-to-be-downloaded (or simply a target app) on an app platform, and the target app has not been installed on the terminal.

The app platform is configured to present information about the target app, or is configured to download the target app. Optionally, the app platform may be an app store or similar platform.

S504: The terminal receives program information of the target app returned by the server, where the target app runs on the server in response to the remote operation request, and the target app is installed on the server.

S506: The terminal sends a remote operation instruction to the server based on the program information, where the remote operation instruction is used to instruct the server to perform an operation on the target app running on the server.

S508: The terminal receives a remote operation result returned by the server, where the remote operation result is a result obtained by performing the operation on the running target app.

According to one embodiment of the present disclosure, when a target app has not been installed on a terminal, the terminal sends a request to a server to perform a remote operation on the target app. Specifically, the server installs and starts the target app, and the terminal sends a remote operation instruction to the server, and receives a remote operation result returned by the server, so as to implement the remote operation on the target app (that is, trial of the target app). After the terminal acquires the remote operation result, a user of the terminal may decide, based on the remote operation result, whether to download the target app from the server. Thus, a user may remotely operate an app before downloading the app, so that a variety of information about the app can be accurately obtained, and the user may decide, according to realistic experience in trial, whether the user wants the app and whether to download the app. This not only can reduce the data usage of the user and the server, but also helps the user to obtain the app that the user really wants, thereby improving the efficiency of distribution of apps.

The terminal may be a mobile terminal that needs to download the target app. Before the terminal downloads the target app, an app store client installed on the terminal is operated to generate a remote operation request. For example, a trial button on an interface configured to display the app store client is operated to generate the remote operation request. The remote operation request is used to request to perform a remote operation on the target app on the server.

Optionally, the remote operation request may include at least one of a package name, a version number, and an app ID of the target app, and may further include at least one of a size of a screen of the terminal, resolution of the screen of the terminal, and a model of the terminal.

At least one of the package name, the version number, and the app ID of the target app is used for the server to install and run the target app. Specifically, the server may be a server that provides downloading of the target app, for example, an app store server. After receiving the remote operation request, the server may detect, based on identifier information (for example, at least one of the package name, the version number, and the app ID) of the target app, whether the target app has been installed on the server, on a simulator or a real machine environment of the server. If the target app has been installed on the server, the target app is started and run. If the target app has not been installed on the server, the target app is installed and run, so that the target app is run on the simulator of the server or the real machine environment.

After installing and running the target app, the server returns the program information of the target app to the terminal. The terminal sends the remote operation instruction to the server based on the program information, and receives the remote operation result returned after the server executes the remote operation instruction.

The target app in one embodiment may belong to a variety of categories, such as a game category, a leisure category, a financial category, a social networking category, an image category, a travel category, a shopping category, or an education category. The category to which the target app belongs is not limited in the present disclosure. Apps in various categories are all applicable to the remote operation solution of the present disclosure. That is, the disclosed embodiments may be applied to any app, and there is no limitation on apps, unlike the existing technology that preview apps using video and content-capturing.

The user chooses the target app by using an application download client installed on the terminal, and enters a preview interface of the target app. A remote operation button (for example, a trial button) is recorded on the preview interface. A remote operation request is generated when the remote operation button is pressed, and it is prompted on the screen of the terminal whether to send the remote operation request to the server. If an operation request of sending the remote operation request to the server is received, the remote operation request is sent to the server. After receiving the remote operation request, performing initialization (that is, installing and running the target app), and completing the initialization, the server returns the program information of the target app to the terminal. The program information may guide the user to generate the remote operation instruction. After generating the remote operation instruction, the user sends the remote operation instruction to the server. After executing the remote operation instruction to generate the remote operation result, the server displays the remote operation result on the screen of the terminal. The user may select, based on the remote operation result, whether to download the target app from the server.

One embodiment of the present disclosure is described below in detail by using an example in which a WeChat app is the target app:

The user enters the app store client installed on the terminal and chooses the WeChat app to enter a preview interface of the WeChat app. A trial button is recorded on the preview interface. A remote operation request (for example, a trial request) may be generated by tapping the trial button, and the remote operation request is sent to the server corresponding to the app store client. After the server receives the request, if the WeChat app has not been installed on a simulator on the server, the server invokes a program installation package of the WeChat app from a memory. The program installation package is installed on the simulator on the server, and the WeChat app is run on the simulator of the server. Then program information of the WeChat app is returned to the terminal to notify the terminal that a remote operation may be started.

After receiving the program information, the terminal uses the program information to guide the user to generate the remote operation instruction. The user is guided by the program information to generate the remote operation instruction, and then sends the remote operation instruction to the server, so as to instruct the server to perform a same operation at a corresponding position and generate a remote operation result. The user may select, based on the operation result, whether to download the WeChat app.

According to one embodiment, a user may use a network to remotely test an app running at the backend on the real server environment or the simulator. Thus, the user may decide, according to realistic experience in trial, whether the user needs the app and whether to download the app. This not only can reduce data usage of the user and an app store, but also helps the user to obtain apps that the user really wants, thereby improving the efficiency of distribution.

In S506, in one embodiment, the process of sending, by the terminal, a remote operation instruction to the server based on the program information includes: displaying the program information on a screen of the terminal; detecting the operation performed at a first operation position of the screen of the terminal; generating the remote operation instruction, where the remote operation instruction indicates the first operation position and the operation; and sending the remote operation instruction to the server.

After returning the program information of the target app to the terminal, the terminal displays the received program information on the screen of the terminal. The program information may guide the user to input an operation instruction. The user may be guided by the program information to perform an operation at the first operation position on the screen of the terminal. After detecting the operation, the terminal generates the remote operation instruction used to indicate the first operation position and the operation, and sends the remote operation instruction to the server, so as to instruct the server to perform the operation at a second operation position corresponding to the first operation position.

The operation includes: an upward swipe, a downward swipe, a tap, a press, a lift, and the like.

It should be noted that the program information may include initial state information and a measured time of the target app, and the process of displaying, by the terminal, the program information on a screen of the terminal may include: displaying the initial state information on a screen of the terminal; and displaying the measured time on the screen of the terminal in a floating manner, or displaying the initial state information with the measured time embedded therein.

Specifically, after the server receives a remote operation request, the installed target app is run on the server in response to the remote operation request. After the target app is started and run, the server may record a remote operation time, and at the same time record the initial state information and time duration of the target app in the program information and send the program information to the terminal. After the terminal receives the program information of the target app returned by the server, the terminal displays the initial state information on the screen of the terminal. The time duration is displayed in a corner of the screen of the terminal in a form of a floating box; or, the time duration is displayed in the initial state information in an embedded format on the screen of the terminal.

The time duration may be a preset maximum time of a remote operation. The time duration may be displayed in a countdown. For example, the time duration is 5 minutes. As time passes, the time displayed at the position of the time duration keeps becoming less.

It should be noted that the initial state information may be information about a primary interface of the target app, or interface information of a function. An operation button and prompt information may be recorded in the initial state information. The operation button and the prompt information are used to guide the user to perform an operation, so as to use a function of the target app.

For example, the initial state information is information about the primary interface of the target app. A "discover" button is recorded in the information about the primary interface. The user may tap the button to enter a discovery page, so as to use a discovery function of the target app.

In one embodiment, the terminal may send a plurality of remote operation instructions to the server. Because the server returns time duration at the same time when the server returns the initial state information, when the time duration is up, the terminal can no longer send a remote operation instruction to the server, that is, the trial of the target app ends.

Optionally, each time one remote operation instruction is received, the server executes the remote operation instruction to generate a remote operation result. The terminal may display the remote operation result on the terminal, until the trial ends.

At the same time when the terminal sends the plurality of remote operation instructions to the server, the server also records a remote operation time, for example, starts timing when the server starts to run the target app; or after receiving a first remote operation instruction, the server starts timing. If the remote operation time recorded by the server exceeds the preset operation duration, the server stops responding to a remote operation instruction sent by the terminal, or the server automatically stops running the target app, so as to stop responding to a remote operation instruction of the terminal.

Specifically, after the terminal receives a remote operation result returned by the server, the terminal receives operation end information sent by the server, where the operation end information is used to instruct the server to stop responding to the remote operation instruction sent by the terminal.

Figure 6:
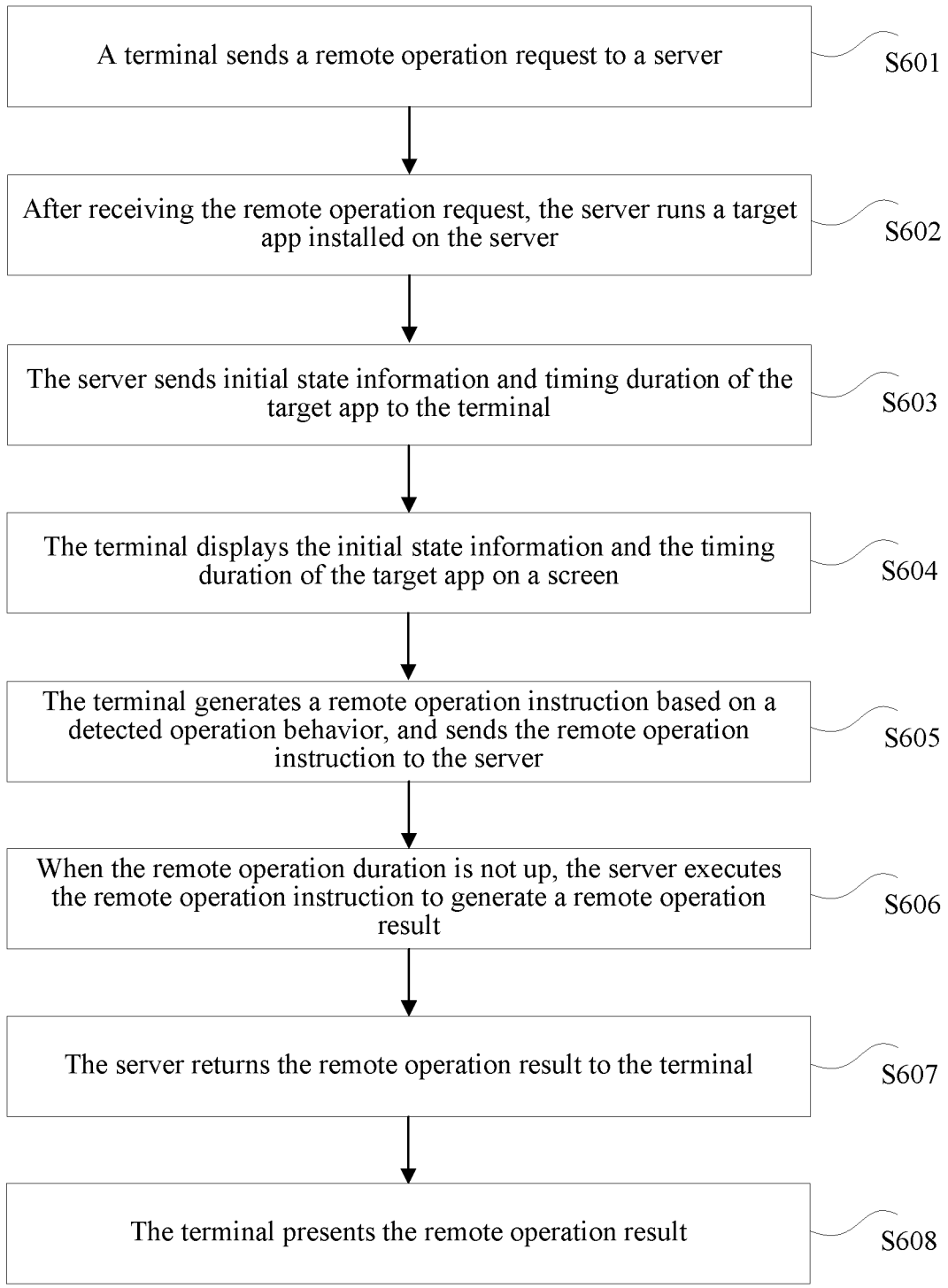
FIG. 6 is a flowchart of an app processing method according to an embodiment of the present disclosure.

One embodiment of the present disclosure is described below in detail with reference to FIG. 6. As shown in FIG. 6, one embodiment of the present disclosure may be implemented by using the followings.

S601: A terminal sends a remote operation request to a server.

The remote operation request is used to request to perform a remote operation on a target app, and the target app has not been installed on the terminal.

S602: After receiving the remote operation request, the server runs the target app installed on the server.

S603: The server sends initial state information and time duration of the target app to the terminal.

S604: The terminal displays the initial state information and the time duration of the target app on a screen of the terminal.

S605: The terminal generates a remote operation instruction based on a detected operation behavior, and sends the remote operation instruction to the server.

S606: When the remote operation duration is not up, the server executes the remote operation instruction to generate a remote operation result.

S607: The server returns the remote operation result to the terminal.

S608: The terminal presents the remote operation result.

In an embodiment, at a server end, a screenshot is created on a screen of the server at a certain time interval, and the screenshot picture is returned to the terminal for presentation. Because human eyes can distinguish only a frame rate of 24 frames per second, the frequency of creating screenshots at the server end is generally less than that value.

In another embodiment, original image data outputted to the screen may be acquired at the server end at a certain time interval. The original image data is compressed and encoded to obtain playable video stream data. A stream media server may be used to transfer the video stream to the connected terminal using the RTSP protocol. The terminal uses the stream media player to play the video stream returned by the server, so that the remote running of the target app can be viewed on the terminal.

According to one embodiment, a user may test or try an app before the user decides to download the app according to the trial experience. An app streaming technology may be used to provide the app trial function, or screenshots are created and returned, so that the screenshots are played on the terminal in response to the user operation, so as to implement the trial of the target app.

It should be noted that the foregoing method embodiments are illustrated as a series of action combinations for ease of description. However, a person skilled in the art should know that the present disclosure is not limited to the described order of actions, because based on the present disclosure, some steps may be performed in another order or at the same time. Further, a person skilled in the art should know that the embodiments described in the specification are illustrative, and the involved actions and modules are not necessarily required in the present disclosure.

Through the above description of the implementation, it is clear to persons skilled in the art that the methods in one embodiments may be accomplished through hardware, or through software plus a necessary universal hardware platform. Based on this, the technical solutions of the present disclosure may be embodied in the form of a software product. The computer software product may be stored in a storage medium (for example, a ROM/RAM, USB flash drive, a magnetic disk or an optical disc) and contain several instructions adapted to instruct computer equipment (for example, a mobile phone, a computer, a server, or network equipment) to perform the method according to the embodiments of the present disclosure.

Figure 7:
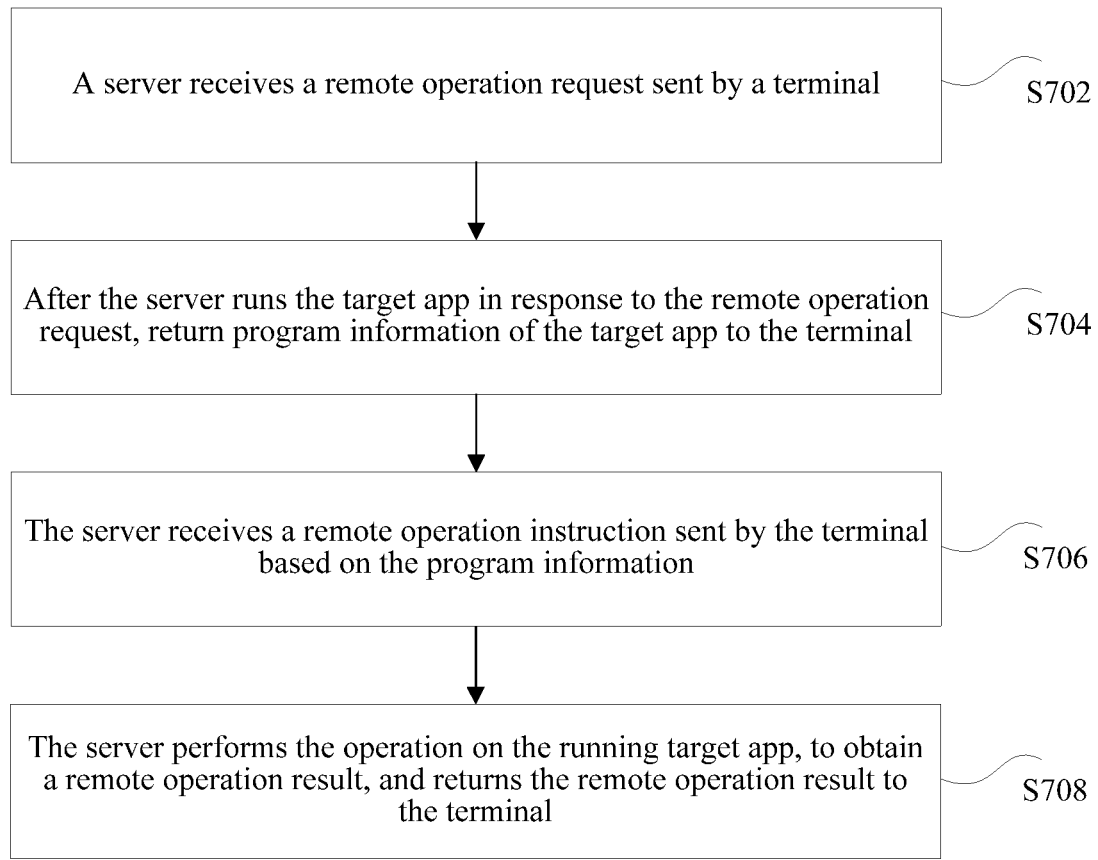
FIG. 7 is a flowchart of another app processing method according to an embodiment of the present disclosure.

In the operating environment, an app processing method is shown in FIG. 7. The method may be implemented by using the followings.

S702: A server receives a remote operation request sent by a terminal, where the remote operation request is used to request to perform a remote operation on a target app-to-be-downloaded on an app platform, and the target app has not been installed on the terminal.

S704: After the server runs the target app in response to the remote operation request, the server returns program information of the target app to the terminal, where the target app is installed on the server.

S706: The server receives a remote operation instruction sent by the terminal based on the program information, where the remote operation instruction is used to instruct to perform an operation on the target app running on the server.

S708: The server performs the operation on the running target app, to obtain a remote operation result, and returns the remote operation result to the terminal.

According to one embodiment of the present disclosure, when a target app has not been installed on a terminal, the terminal sends a request to a server to perform a remote operation on the target app. Specifically, the server installs and runs the target app, and the terminal sends a remote operation instruction to the server, and receives a remote operation result returned by the server, so as to implement the remote operation on the target app (that is, trial of the target app). After the terminal acquires the remote operation result, a user of the terminal may decide, based on the remote operation result, whether to download the target app from the server. According to one embodiment, a user may remotely operate an app before downloading the app, so that a variety of information about the app can be accurately obtained, and the user may decide, according to realistic experience in trial, whether the user needs the app and whether to download the app. This not only can reduce the data usage of the user and the server, but also helps the user to obtain apps that the user really wants, thereby improving the efficiency of distribution.

The app platform is configured to present information about the target app, or configured to download the target app. Optionally, the app platform may be an app store.

The terminal in one embodiment may be a mobile terminal that needs to download the target app. Before the terminal downloads the target app, an app store client installed on the terminal is operated to generate a remote operation request. For example, a trial button on an interface configured to display the app store client is operated to generate the remote operation request. The remote operation request is used to request to perform a remote operation on the target app on the server.

Optionally, the remote operation request may include at least one of a package name, a version number, and an app ID of the target app, and may further include at least one of a size of a screen of the terminal, resolution of the screen of the terminal, and a model of the terminal.

At least one of the package name, the version number, and the app ID of the target app is used for the server to install and run the target app. Specifically, the server may be a server, for example, an app store server, that provides downloading of the target app. After receiving a remote operation request, the server may detect, based on identifier information (for example, at least one of the package name, the version number, and the app ID) of the target app, whether the target app has been installed on a simulator or a real machine environment of the server. If the target app has been installed on the server, the target app is started and run. If the target app has not been installed on the server, the target app is installed and run, so that the target app is run on the simulator of the server and the real machine environment.

The target app in one embodiment may belong to a variety of categories such as a game category, a leisure category, a financial category, a social networking category, an image category, a travel category, a shopping category, or an education category. The category to which the target app belongs is not limited in the present disclosure. Apps in various categories are all applicable to the remote operation solution of the present disclosure. That is, one embodiment may be applied to any app, and there is no limitation on apps, unlike the existing technology previewing apps using video and content capturing.

The user chooses the target app by using an application download client installed on the terminal, and enters a preview interface of the target app. A remote operation button (for example, a trial button) is recorded on the preview interface. A remote operation request is generated when the remote operation button is pressed, and it is prompted on the screen of the terminal whether to send the remote operation request to the server. If an operation request of sending the remote operation request to the server is received, the remote operation request is sent to the server. After receiving the remote operation request, performing initialization (that is, installing and running the target app), and completing the initialization, the server returns the program information of the target app to the terminal. The program information may guide the user to generate the remote operation instruction. After generating the remote operation instruction, the user sends the remote operation instruction to the server. After executing the remote operation instruction to generate the remote operation result, the server displays the remote operation result on the screen of the terminal. The user may select, based on the remote operation result, whether to download the target app from the server.

It should be noted that in one embodiment, the size of the screen of the terminal, the resolution of the screen of the terminal, and the model of the terminal that are carried in the remote operation request may be used by the server to set screen parameters on a simulation device or a simulator.

In an optional solution, the resolution of the screen of the terminal may be used to set the resolution of a screen of the server for displaying operation information of running the target app. Optionally, the resolution of the screen of the terminal may be the same as the resolution of the screen of the server. In this case, when the server returns the remote operation result to the terminal, the displaying resolution of the remote operation result is consistent with the resolution of the screen of the terminal, and a displaying effect of the remote operation result is desirable.

In another optional solution, the first size of the screen of the terminal may be used to set the size of the display interface on the screen of the server and used to display the running information of running the target app. In this case, the operation positions on the display interface on the server may correspond one-to-one to the operation positions on the terminal. Because of the same sizes, a first operation position is a second operation position, and the server does not need to consume extra computing resources to determine the second operation position, so that the resources on the server are saved and the processing speed is increased.

Optionally, if information about the terminal included in the remote operation request includes only the model of the terminal, a first size of the terminal may be obtained based on the model of the terminal, and the size of the display interface on the screen of the server is set based on the first size of the terminal.

In S708, the process of performing, by the server, the operation on the running target app may include: acquiring a first operation position of the operation that the remote operation instruction instructs to perform on the screen of the terminal; determining a second operation position that is on the screen of the server configured to display running information of the target app and corresponds to the first operation position; and performing the operation on the second operation position on the screen of the server.

Specifically, the remote operation request includes the first resolution of the screen of the terminal, and the process of determining a second operation position that is on a screen of the server configured to display running information of the target app and corresponds to the first operation position includes: acquiring second resolution of the screen of the server; and determining a width and a height of coordinates corresponding to the second operation position according to the first resolution, the second resolution, and the first operation position.

Further, the determining a width and a height of coordinates corresponding to the second operation position according to the first resolution, the second resolution, and the first operation position includes: determining the width $W_{p\_server}$ of the coordinates corresponding to the second operation position according to a first formula, where the first formula is:

$$W_{p\_server} = \frac{W_{p\_mobile}}{W_{mobile}} * W_{server},$$

where $W_{p\_mobile}$ represents a width of coordinates corresponding to the first operation position; $W_{mobile}$ mobile represents a width of the screen of the terminal indicated by the first resolution; and $W_{server}$ represents a width of the screen of the server indicated by the second resolution; and determining the height $H_{p\_server}$ of the coordinates corresponding to the second operation position according to a second formula, where the second formula is:

$$H_{p\_server} = \frac{H_{p\_mobile}}{H_{mobile}} * H_{server},$$

where $H_{p\_mobile}$ represents a height of the coordinates corresponding to the first operation position; $H_{mobile}$ mobile represents a height of the screen of the terminal indicated by the first resolution; and $H_{server}$ represents a height of the screen of the server indicated by the second resolution.

Figure 8:
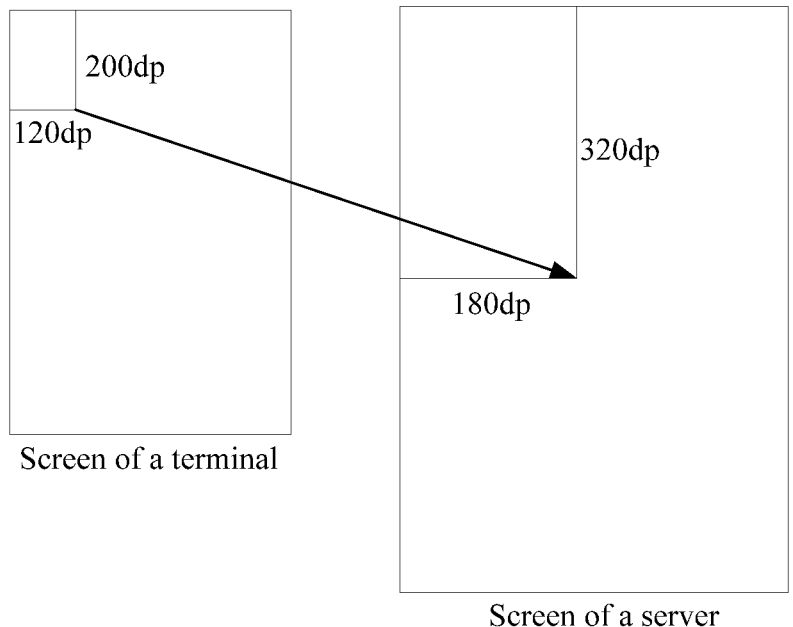
FIG. 8 is a schematic diagram of mapping of operation positions according to an embodiment of the present disclosure.

Specifically, after receiving the remote operation instruction (for example, an operation event) on the terminal, the server calculates, according to the difference between the first resolution of the screen of the terminal and the second resolution of the back-end server, a specific position at which an application running on the simulator or the real machine environment on the server responds to the operation event. One embodiment is described below in detail with reference to FIG. 8. The terminal shown in FIG. 8 may be a mobile terminal (for example, a mobile phone). The first resolution of the screen of the mobile terminal is 800*480, and the second resolution of the screen of the simulator (or the real machine environment) running on the back-end server is 1280*720.

When determining the second operation position, the coordinates (120, 200) of the first operation position on the screen of the mobile phone of the user is mapped to the coordinates (180, 320) of the second operation position on the screen of the server. The calculation is as follows:

a width after mapping (that is, a width of the coordinates corresponding to the second operation position)=(120/480)*720=180; and a height after mapping (that is, a height of the coordinates corresponding to the second operation position)=(200/800)*1280=320.

After the second operation position for performing the operation is determined and the operation is performed on the second operation position, screenshots are taken on the display interface on the screen of the server, to obtain an interface picture, where the display interface is configured to display the running information of the target app; and the remote operation result is generated based on the interface picture, and the remote operation result is then returned to the terminal, where the terminal presents the remote operation result.

In one embodiment, if the running information of the target app is displayed on the screen of the server in full screen mode, screenshots may be directly taken on the screen of the server. If the running information of the target app is not displayed on the screen of the server in full screen mode, screenshots may be taken on the display interface on the screen of the server.

Similarly, the terminal may display the program information or a remote operation interface returned by the server in full screen mode or by using a partial area of the screen.

In one embodiment, the performing screenshot processing on the screen of the server, to obtain an interface picture includes: performing a screenshot operation on the screen of the server at every time interval of a preset duration, to obtain a plurality of interface pictures.

According to one embodiment, the terminal sends one remote operation instruction. The server may capture a plurality of interface pictures. When capturing the plurality of interface pictures, the server may capture one interface picture at a time interval, or may capture interface pictures according to a predetermined time sequence of capturing. For example, the time sequence is [1, 2, 1, 2, 1, 2, . . . ], and the unit of the time sequence is 0.01 ms. In this case, the time interval between capturing of a first interface picture and capturing of a second interface picture may be 0.01 ms, the time interval between capturing of the second interface picture and capturing of a third interface picture may be 0.02 ms, and so on. The time sequence is only used as an example for description, and specific capturing time and a specific capturing quantity are not limited in the present disclosure.

In one embodiment, each time the server captures one interface picture, the server returns the interface picture to the terminal. The terminal presents the interface picture. As the terminal receives and presents a plurality of interface pictures, the user of the terminal may acquire the remote operation result without any delay.

Further, the process of generating the remote operation result based on the interface picture may further include:

compressing and encoding the plurality of interface pictures, to obtain video stream data, and using the video stream data as the remote operation result.

Specifically, the captured plurality of interface pictures is compressed and encoded to generate video stream data frame by frame, and the video stream data is sent to the terminal. The user of the terminal may watch a trial result in a form of playing a short video.

To further save the resources on the server and safeguard the interests of an app developer, the present disclosure further provides a solution for performing a remote operation within a time limit. Specifically, the returning program information of the target app to the terminal includes: returning initial state information and a time duration of the target app to the terminal, and starting to record remote operation time. The performing, by the server, the operation on the running target app includes: when the remote operation time is less than preset operation duration, performing the operation on the target app on the server.

Optionally, to interrupt a remote operation of the terminal in time, after the receiving, by the server, a remote operation instruction sent by the terminal based on the program information, the method further includes: when the remote operation duration is not less than the preset operation duration, stopping running the target app on the server; and sending an operation end message to the terminal, where the operation end message is used to prompt the server to stop running the target app.

To further safeguard the interests of the app developer and save the resources on the server, the number of times that the terminal sends a remote operation request and successfully performs a remote operation may be recorded. If the number of times exceeds a preset number of times, when a remote operation request of the terminal is received a next time, the server stops responding to the remote operation request, and sends a prompt message to the terminal. The prompt message is used to prompt the terminal that the server does not respond to the remote operation request. According to one embodiment, a terminal that maliciously performs a remote operation may be recognized.

Specifically, remote operation requests of different terminals may be distinguished by using identifiers of the terminals carried in the remote operation requests.

According to one embodiment, when a user downloads an app in an electronic market, a trial function is used to provide the user with effective and real app information, so as to provide a reference for the user to decide whether the user needs the app and whether to download the app.

Figure 9:
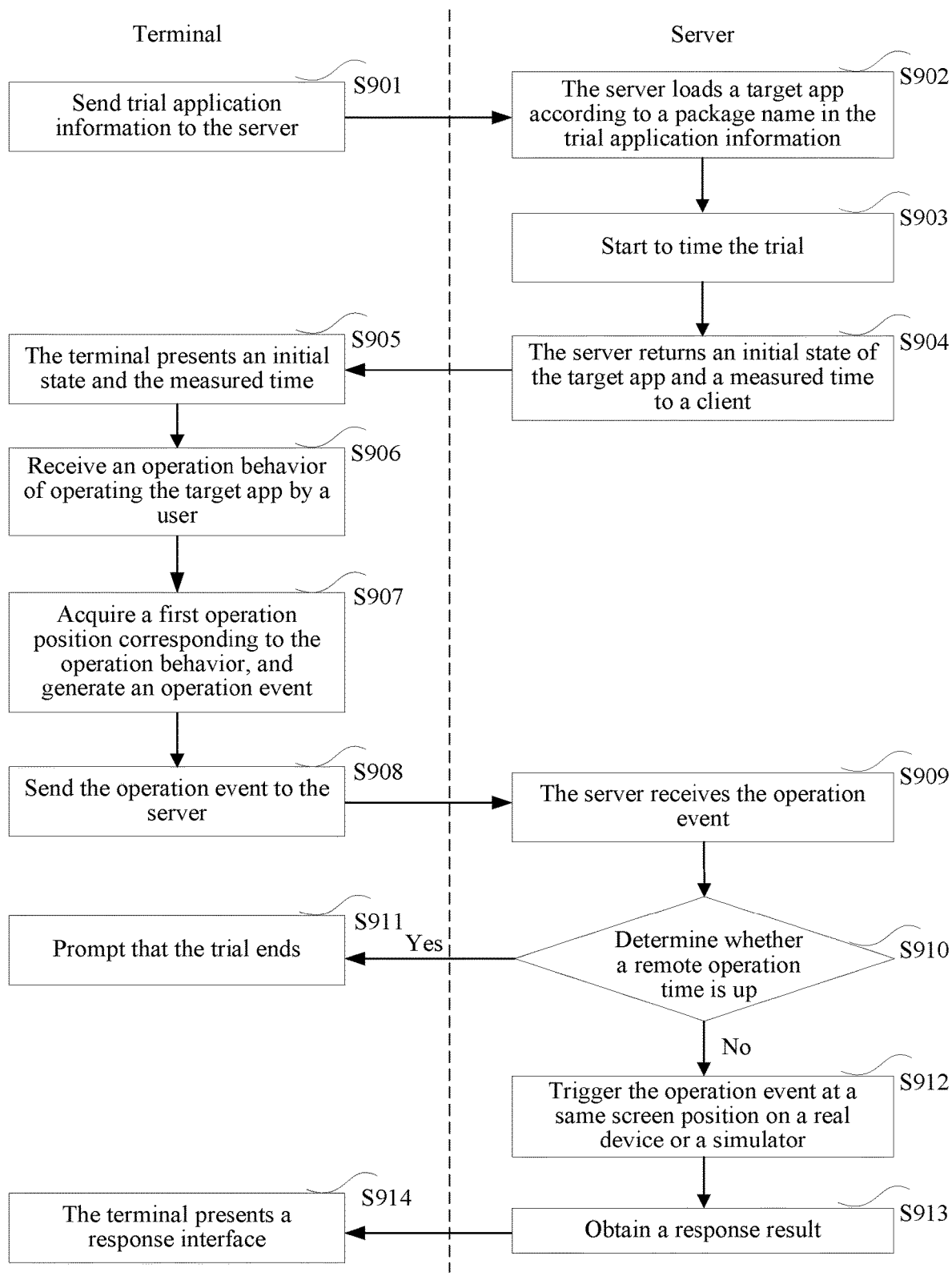
FIG. 9 is a timing diagram of another app processing method according to an embodiment of the present disclosure.

One embodiment of the present disclosure is described below in detail with reference to FIG. 9.

S901: Sending trial application information to a server.

Specifically, when a user starts the trial, the trial application information sent to the server mainly includes: a package name, a version number, and an app ID of an app, a size of a screen of a mobile phone, resolution of the screen of the mobile phone, a model of the mobile phone, and the like.

S902: The server loads a target app according to the package name and/or other information in the trial app information.

After receiving the trial request, and using a code instruction, the server installs and opens an app that the user intends to test, such that the trial can be timed. If the app has been installed on the server, the app is directly started.

S903: Start to time the trial.

S904: The server returns an initial state of the target app and a measured time to a client on the mobile phone.

After running the target app, the server notifies the client, and the user may start to test the app.

S905: The terminal or mobile phone presents the initial state and the measured time.

S906: The terminal detects an operation behavior for operating the target app by the user.

S907: The terminal acquires a first operation position corresponding to the operation behavior, and generate an operation event.

S908: The terminal sends the operation event to the server.

Specifically, when the user performs an operation, an event (for example, an upward swipe, a downward swipe, a tap, a finger press, or a finger lift) and a screen position of a finger touch of each operation are sent to the server as the operation event.

S909: The server receives the operation event.

S910: Determining whether a remote operation time is up.

If the remote operation time is up, the process turns to S911. If the remote operation time is not up, the process turns to S912.

In order to save the resources on the server, a trial duration may be set for the user to test a single app. When a trial time of the user exceeds the trial duration, a trial end prompt is provided.

S911: Prompting that the trial ends.

S912: Triggering the operation event at a same screen position (that is, a second operation position) on a real machine environment or a simulator.

After receiving the operation event of the terminal, the server calculates, according to a difference between the resolution of a screen of a terminal and the resolution of a back-end server, a specific position at which the app on the simulator or the real machine environment running on the server responds the event. After obtaining coordinates in an application area, the server uses an adb command or an automation tool such as a UiAutomator or Robotium to trigger, at a position corresponding to the real machine environment or the simulator, the operation event of the user sent by the terminal.

Optionally, screenshot processing is performed on the screen at each certain time interval at the server end, and a picture is returned to the terminal for presentation. Because human eyes can distinguish only a frame rate of 24 frames per second, the frequency of creating screenshots at the server end should not be less than that value.

Figure 10:
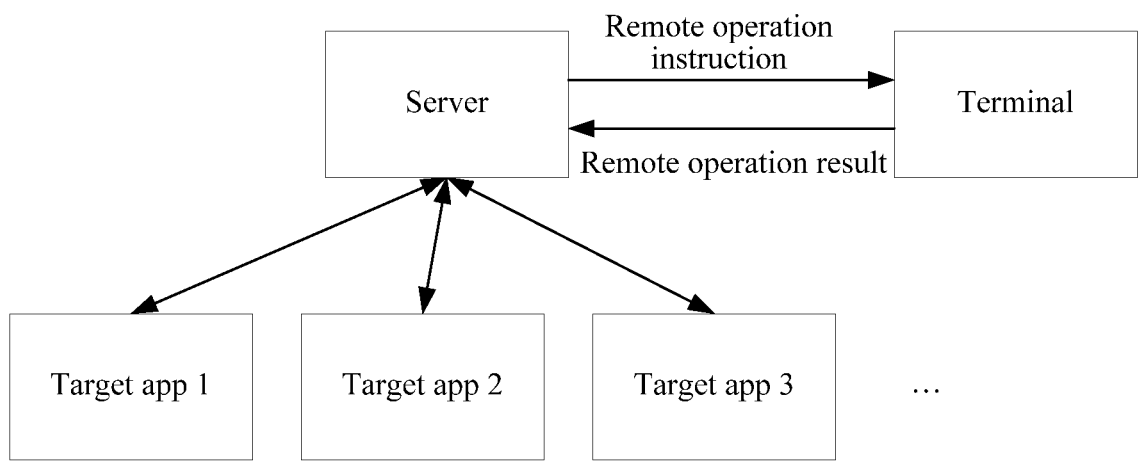
FIG. 10 is a principle block diagram of an app processing method according to an embodiment of the present disclosure.

In an optional solution, an app streaming technology may be used to generate a response result (that is, a remote operation result). As shown in FIG. 10, this may be implemented by using the following steps: acquiring, at the server end at each particular time interval, original image data outputted to the screen; compressing and encoding the original image data to obtain playable video stream data; using a stream media server to transfer a video stream to a connected client by using the RTSP protocol; and using, by the client, the stream media player to play the video stream returned by the server, so that the remote running of the APP can be viewed.

S913: Obtaining a response result (that is, a remote operation result).

S914: The terminal presents a response interface (that is, the response result).

After the trial of an app ends, whether the app needs to be downloaded may be decided according to the experience of the trial.

It should be noted that the foregoing method embodiments are illustrated as a series of action combinations for ease of description. However, a person skilled in the art should know that the present disclosure is not limited to the described order of actions, because based on the present disclosure, some steps may be performed in another order or at the same time. Further, a person skilled in the art should know that the embodiments described in the specification are illustrative, and the involved actions and modules are not necessarily required in the present disclosure.

Through the above description of the implementation, it is clear to persons skilled in the art that the methods in one embodiments may be accomplished through hardware, or through software plus a necessary universal hardware platform. Based on this, the technical solutions of the present disclosure may be embodied in the form of a software product. The computer software product may be stored in a storage medium (for example, a ROM/RAM, USB flash drive, a magnetic disk or an optical disc) and contain several instructions adapted to instruct computer equipment (for example, a mobile phone, a computer, a server, or network equipment) to perform the method according to the embodiments of the present disclosure.

Figure 11:
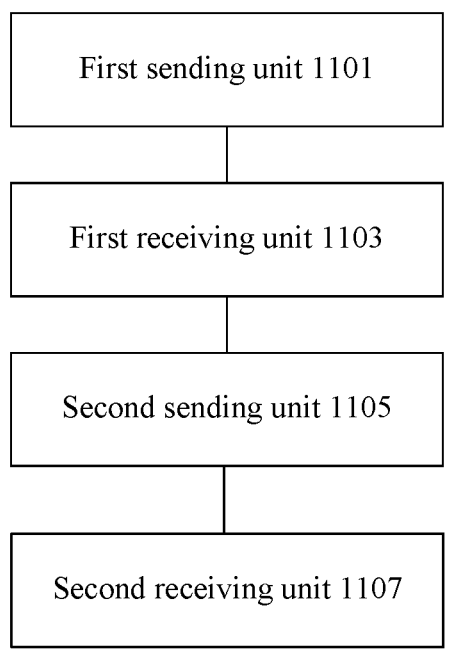
FIG. 11 is a schematic diagram of an app processing apparatus according to an embodiment of the present disclosure.

According to one embodiment of the present disclosure, an app processing apparatus configured to implement the described app processing method is further provided. As shown in FIG. 11, the apparatus includes a first sending unit 1101, a first receiving unit 1103, a second sending unit 1105, and a second receiving unit 1107.

The first sending unit 1101 is configured to send a remote operation request to a server, where the remote operation request is used to request to perform a remote operation on a target app-to-be-downloaded on an app platform, and the target app has not been installed on a terminal.

The first receiving unit 1103 is configured to receive program information of the target app returned by the server, where the target app runs on the server in response to the remote operation request, and the target app is installed on the server.

The second sending unit 1105 is configured to send a remote operation instruction to the server based on the program information, where the remote operation instruction is used to instruct to perform an operation on the target app running on the server.

The second receiving unit 1107 is configured to receive a remote operation result returned by the server, where the remote operation result is a result obtained by performing the operation on the running target app.

In one embodiment of the present disclosure, when a target app has not been installed on a terminal, the terminal sends a request to a server to perform a remote operation on the target app. Specifically, the server installs and runs the target app, and the terminal sends a remote operation instruction to the server, and receives a remote operation result returned by the server, so as to implement the remote operation on the target app (that is, trial of the target app). After the terminal acquires the remote operation result, a user of the terminal may decide, based on the remote operation result, whether to download the target app from the server. According to one embodiment, a user may remotely operate an app before downloading the app, so that a variety of information about the app can be accurately obtained, and the user may decide, according to realistic experience in trial, whether the user needs the app and whether to download the app. This not only can reduce the data usage of the user and the server, but also helps the user to obtain apps that the user really wants, thereby improving the efficiency of distribution.

Further, the second sending unit 1105 specifically includes: a display module, configured to display the program information on a screen of the terminal; a detection module, configured to detect the operation performed at a first operation position of the screen of the terminal; a generation module, configured to generate the remote operation instruction, where the remote operation instruction indicates the first operation position and the operation; and a sending module, configured to send the remote operation instruction to the server.

Optionally, the program information includes initial state information and a measured time duration for the target app, and the apparatus further includes: a first display unit, configured to display the initial state information on a screen of the terminal; and a second display unit, configured to: display the measured time duration on the screen of the terminal in a floating manner, or, display the measured time duration embedded in the initial state information.

It should further be noted that, a second receiving unit is further configured to: after the receiving, by the terminal, a remote operation result returned by the server, receive operation end information sent by the server, where the operation end information is used to instruct the server to stop responding to the remote operation instruction sent by the terminal.

According to one embodiment of the present disclosure, another app processing apparatus configured to implement the described app processing method is further provided. The apparatus includes a first receiving unit, a returning unit, a second receiving unit, and a processing unit.

The first receiving unit is configured to receive a remote operation request sent by a terminal, where the remote operation request is used to request to perform a remote operation on a target app-to-be-downloaded on an app platform, and the target app has not been installed on the terminal.

The returning unit is configured to: after the target app is installed and run in response to the remote operation request, return program information of the target app to the terminal, where the target app has been installed on a server.

The second receiving unit is configured to receive a remote operation instruction sent by the terminal based on the program information, where the remote operation instruction is used to instruct to perform an operation on the target app running on the server.

The processing unit is configured to: perform the operation on the running target app, to obtain a remote operation result, and return the remote operation result to the terminal.

Specifically, the processing unit may include: a first acquiring module, configured to acquire a first operation position of the operation that the remote operation instruction instructs to perform on a screen of the terminal; a determining module, configured to determine a second operation position that is on a screen of the server configured to display running information of the target app and corresponds to the first operation position; and an execution module, configured to perform the operation on the second operation position on the screen of the server.

Further, the remote operation request includes: first resolution of the screen of the terminal, and the determining module includes: an acquiring submodule, configured to acquire second resolution of the screen of the server; and a determining submodule, configured to determine a width and a height of coordinates corresponding to the second operation position according to the first resolution, the second resolution, and the first operation position.

It should be noted that the apparatus may further include: a screenshot unit, configured to: after the operation is performed on the second operation position on the screen of the server, perform screenshot processing on a display interface on the screen of the server, to obtain an interface picture, where the display interface is configured to display the running information of the target app; and a result generation unit, configured to generate the remote operation result based on the interface picture.

Further, the returning unit is specifically configured to: return initial state information and time duration of the target app to the terminal, and start to record remote operation duration. The processing unit is specifically configured to: when the remote operation duration is less than preset operation duration, perform the operation on the target app on the server.

The modules provided in one embodiment and corresponding steps in the method embodiments may have the same methods or may have the same application scenarios. Certainly, it should be noted that the solutions involved in the foregoing modules may be not limited to the content and scenarios in above embodiments, and the foregoing modules may be run on a computer terminal or a mobile terminal, and may be implemented by using software or hardware.

Figure 12:
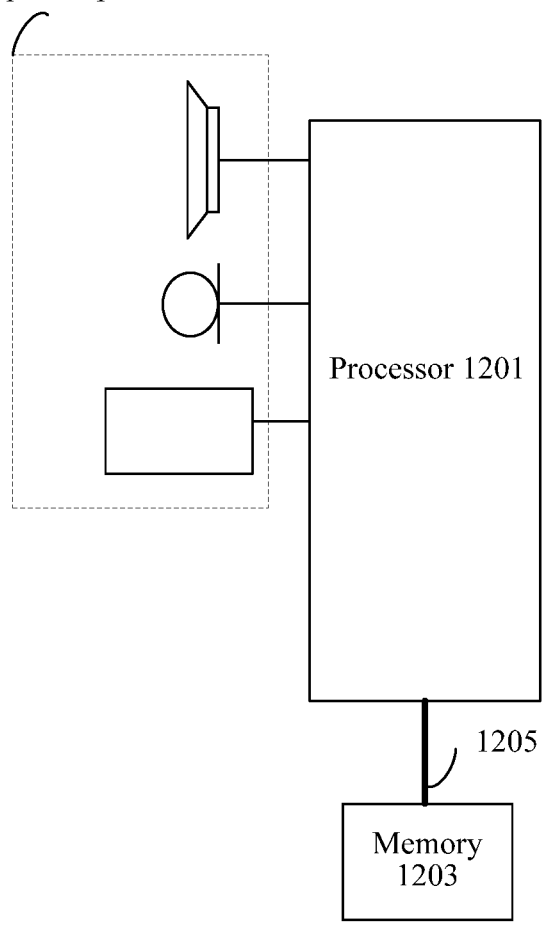
FIG. 12 is a structural block diagram of a terminal or a server according to an embodiment of the present disclosure.

According to one embodiment of the present disclosure, a computer system (a terminal or a server) configured to implement the described app processing method is further provided. As shown in FIG. 12, the computer system (the terminal or the server) includes: one or more (only one is shown in FIG. 12) processors 1201, a memory 1203, and a transmission apparatus 1205. Further, as shown in FIG. 12, the terminal may also include an input/output device 1207.

The memory 1203 may be configured to store software programs and modules, for example, program instructions/modules corresponding to the app processing method and apparatus in one embodiment of the present disclosure. The processor 1201 runs the software program and module stored in the memory 1203, to implement various functional applications and data processing, that is, to implement the described app processing method. The memory 1203 may include a high-speed random-access memory, or may further include a nonvolatile memory, for example, one or more magnetic storage devices, flash memories or other nonvolatile solid-state memories. In some examples, the memory 1203 may further include memories remotely disposed relative to the processor 1201, and these remote memories may be connected to the terminal through a network. Examples of the network include, but are not limited to, the Internet, an intranet, a local area network, a mobile communications network, or a combination thereof.

The transmission apparatus 1205 is configured to receive or send data through one network, and may further be configured to transmit data between the processor 1201 and the memory 1203. Specific examples of the foregoing network may include a wired network and a wireless network. For example, the transmission apparatus 1205 includes a network adapter (network interface controller or NIC), and may be connected to another network device and a router through a network cable to communicate with the Internet or local area network. In an example, the transmission apparatus 1205 is a radio frequency (RF) module, and may be configured to communicate with the Internet by using a wireless manner.

The memory 1203 is configured to store an app.

In one embodiment, a processor in the foregoing computer terminal may perform the following steps in the app processing method: sending a remote operation request to a server, where the remote operation request is used to request to perform a remote operation on a target app-to-be-downloaded on an app platform, and the target app has not been installed on the terminal; receiving program information of the target app returned by the server, where the target app runs on the server in response to the remote operation request, and the target app is installed on the server; sending a remote operation instruction to the server based on the program information, where the remote operation instruction is used to instruct to perform an operation on the target app running on the server; and receiving a remote operation result returned by the server, where the remote operation result is a result obtained by performing the operation on the running target app.

In one embodiment, a processor in the foregoing server may perform the following steps in the app processing method: receiving a remote operation request sent by a terminal, where the remote operation request is used to request to perform a remote operation on a target app-to-be-downloaded on an app platform, and the target app has not been installed on the terminal; after the server installs and runs the target app in response to the remote operation request, returning program information of the target app to the terminal, where the target app is installed on the server; receiving a remote operation instruction sent by the terminal based on the program information, where the remote operation instruction is used to instruct to perform an operation on the target app running on the server; and performing the operation on the running target app, to obtain a remote operation result, and returning the remote operation result to the terminal.

In one embodiment of the present disclosure, when a target app has not been installed on a terminal, the terminal sends a request to a server to perform a remote operation on the target app. Specifically, the server installs and runs the target app, and the terminal sends a remote operation instruction to the server, and receives a remote operation result returned by the server, so as to implement the remote operation on the target app (that is, trial of the target app). After the terminal acquires the remote operation result, a user of the terminal may decide, based on the remote operation result, whether to download the target app from the server. According to one embodiment, a user may remotely operate an app before downloading the app, so that a variety of information about the app can be accurately obtained, and the user may decide, according to realistic experience in trial, whether the user needs the app and whether to download the app. This not only can reduce the data usage of the user and the server, but also helps the user to obtain apps that the user really wants, thereby improving the efficiency of distribution.

One embodiment of the present disclosure further provides a storage medium. Optionally, in one embodiment, the storage medium may store code used to perform an app processing method.

Optionally, in one embodiment, the storage medium may be at least one of a plurality of network devices located in the network shown in FIG. 4.

Optionally, in one embodiment, the storage medium is configured to store program code used to perform the following steps: sending, by a terminal, a remote operation request to a server, where the remote operation request is used to request to perform a remote operation on a target app-to-be-downloaded on an app platform, and the target app has not been installed on the terminal; receiving, by the terminal, program information of the target app returned by the server, where the target app runs on the server in response to the remote operation request, and the target app is installed on the server; sending, by the terminal, a remote operation instruction to the server based on the program information, where the remote operation instruction is used to instruct to perform an operation on the target app running on the server; and receiving, by the terminal, a remote operation result returned by the server, where the remote operation result is a result obtained by performing the operation on the running target app.

Optionally, in one embodiment, the storage medium is configured to store program code used to perform the following steps: receiving, by a server, a remote operation request sent by a terminal, where the remote operation request is used to request to perform a remote operation on a target app-to-be-downloaded on an app platform, and the target app has not been installed on the terminal; after the server installs and runs the target app in response to the remote operation request, returning program information of the target app to the terminal, where the target app is installed on the server; receiving, by the server, a remote operation instruction sent by the terminal based on the program information, where the remote operation instruction is used to instruct to perform an operation on the target app running on the server; and performing, by the server, the operation on the running target app, to obtain a remote operation result, and returning the remote operation result to the terminal.

In one embodiment of the present disclosure, when a target app has not been installed on a terminal, the terminal sends a request to a server to perform a remote operation on the target app. Specifically, the server installs and runs the target app, and the terminal sends a remote operation instruction to the server, and receives a remote operation result returned by the server, so as to implement the remote operation on the target app (that is, trial of the target app). After the terminal acquires the remote operation result, a user of the terminal may decide, based on the remote operation result, whether to download the target app from the server. According to one embodiment, a user may remotely operate an app before downloading the app, so that a variety of information about the app can be accurately obtained, and the user may decide, according to realistic experience in trial, whether the user needs the app and whether to download the app. This not only can reduce the data usage of the user and the server, but also helps the user to obtain apps that the user really wants, thereby improving the efficiency of distribution.

The sequence numbers of one embodiments of the present disclosure are merely for the convenience of description, and do not imply the preference among the embodiments.

Further, the integrated units in one embodiments may be stored in the foregoing computer readable storage medium. Based on this, the foregoing technical solutions of the present disclosure may be in the form of a software product. The computer software product may be stored in a storage medium and contain several instructions to instruct one or more pieces of computer equipment (for example, a personal computer, a server, or network equipment) to perform all or a part of the steps of the method described in the embodiments of the present disclosure.

In one embodiments of the present disclosure, the descriptions of the embodiments place different emphasis on different content, and for a part that is not detailed in an embodiment, reference can be made to the relevant descriptions of other embodiments.

In the embodiments provided by the present disclosure, it should be understood that the clients disclosed may be implemented in other forms. For example, the device embodiments described above are merely exemplary. The division of units is merely logical functional division, and there are other division forms in real application. For example, a plurality of units or components may be combined or be integrated to another system, or some features may be ignored or not be executed. In another aspect, the coupling, direct coupling, or communication connection there between which is displayed or discussed may be indirect coupling or communication connection of interfaces, units or modules, and may be electrical or in other forms.

It should be noted by persons of ordinary skill in the art that modifications and variations may be made without departing from the principle of the present disclosure, which should be construed as falling within the protection scope of the present disclosure.

What is claimed is:

1. An app processing method for a terminal, comprising:
sending a remote operation request to a server, the remote operation request including a first resolution of a screen of the terminal and being used to request to perform a remote operation on a target app to be downloaded on an app platform, and the target app having not been installed on the terminal;
receiving program information of the target app returned by the server, the target app running on the server in response to the remote operation request, and the target app being installed on the server;
sending a remote operation instruction to the server based on the program information, the remote operation instruction being used to instruct to perform an operation on the target app running on the server; and
receiving a remote operation result returned by the server, the remote operation result being a result obtained by performing the operation on the running target app, including:
sending to the server a first operation position of the operation that the remote operation instruction instructs to perform on the screen of the terminal;
determining, by the server, a second operation position that is on a screen of the server configured to display running information of the target app and corresponds to the first operation position, via acquiring a second resolution of the screen of the server and determining a width and a height of coordinates corresponding to the second operation position according to the first resolution, the second resolution, and the first operation position; and
performing, by the server, the operation on the second operation position on the screen of the server.

2. The method according to claim 1, wherein the sending the remote operation instruction to the server based on the program information comprises:
displaying the program information on the screen of the terminal;
detecting the operation performed at the first operation position of the screen of the terminal;
generating the remote operation instruction, wherein the remote operation instruction indicates the first operation position and the operation; and
sending the remote operation instruction to the server.

3. The method according to claim 1, wherein the program information comprises initial state information and a measured time duration for the target app, and after the receiving program information of the target app returned by the server, the method further comprises:

displaying the initial state information on the screen of the terminal; and displaying the measured time duration on the screen of the terminal in a floating manner, or displaying the measured time duration embedded in the initial state information.

4. The method according to claim 1, wherein, after receiving the remote operation result returned by the server, the method further comprises:

receiving operation end information sent by the server, wherein the operation end information is used to instruct the server to stop responding to the remote operation instruction sent by the terminal.

5. An app processing method for a server, comprising:

receiving a remote operation request sent by a terminal, the remote operation request including a first resolution of a screen of the terminal and being used to request to perform a remote operation on a target app to be downloaded on an app platform, and the target app having not been installed on the terminal;

after running the target app in response to the remote operation request, returning program information of the target app to the terminal, the target app being installed on the server;

receiving a remote operation instruction sent by the terminal based on the program information, the remote operation instruction being used to instruct to perform an operation on the target app running on the server; and performing the operation on the running target app to obtain a remote operation result, and returning the remote operation result to the terminal, including:

acquiring a first operation position of the operation that the remote operation instruction instructs to perform on the screen of the terminal;

determining a second operation position that is on a screen of the server configured to display running information of the target app and corresponds to the first operation position, via acquiring a second resolution of the screen of the server and determining a width and a height of coordinates corresponding to the second operation position according to the first resolution, the second resolution, and the first operation position; and performing the operation on the second operation position on the screen of the server.

6. The method according to claim 5, wherein the determining the width and the height of coordinates corresponding to the second operation position according to the first resolution, the second resolution, and the first operation position comprises:

determining the width $W_{p\_server}$ of the coordinates corresponding to the second operation position according to a first formula, wherein the first formula is:

$$W_{p\_server} = \frac{W_{p\_mobile}}{W_{mobile}} * W_{server},$$

wherein $W_{p\_mobile}$ represents a width of coordinates corresponding to the first operation position; $W_{mobile}$ represents a width of the screen of the terminal indicated by the first resolution; and $W_{server}$ represents a width of the screen of the server indicated by the second resolution; and determining the height $H_{p\_server}$ of the coordinates corresponding to the second operation position according to a second formula, wherein the second formula is:

$$H_{p\_server} = \frac{H_{p\_mobile}}{H_{mobile}} * H_{server},$$

wherein $H_{p\_mobile}$ represents a height of the coordinates corresponding to the first operation position; $H_{mobile}$ represents a height of the screen of the terminal indicated by the first resolution; and $H_{server}$ represents a height of the screen of the server indicated by the second resolution.

7. The method according to claim 5, wherein, after the performing the operation on the second operation position on the screen of the server, the method further comprises:

taking a screenshot on a display interface on the screen of the server to obtain an interface picture, wherein the display interface is configured to display the running information of the target app; and generating the remote operation result based on the interface picture.

8. The method according to claim 7, wherein, when there is a plurality of interface pictures, the generating the remote operation result based on the interface picture comprises:

compressing and encoding the plurality of interface pictures to obtain video stream data; and using the video stream data as the remote operation result.

9. The method according to claim 7, wherein taking the screenshot on a display interface on the screen of the server to obtain an interface picture comprises:

taking the screenshot on the display interface on the screen of the server once every time interval of a preset duration to obtain the plurality of interface pictures.

10. The method according to claim 5, wherein:

the returning program information of the target app to the terminal comprises: returning initial state information and time duration of the target app to the terminal, and starting to record remote operation duration; and the performing the operation on the running target app comprises: when the remote operation duration is less than preset operation duration, performing the operation on the target app on the server.

11. The method according to claim 10, wherein, after receiving the remote operation instruction sent by the terminal based on the program information, the method further comprises:

when the remote operation duration is not less than the preset operation duration, stopping running the target app on the server; and sending an operation end message to the terminal, wherein the operation end message is used to prompt the server to stop running the target app.

12. A terminal for app processing, comprising: a memory; and a processor coupled to the memory; wherein the processor is configured to perform:

sending a remote operation request to a server, the remote operation request including a first resolution of a screen of the terminal and being used to request to perform a remote operation on a target app to be downloaded on an app platform, and the target app having not been installed on the terminal;

receiving program information of the target app returned by the server, the target app running on the server in response to the remote operation request, and the target app being installed on the server;

sending a remote operation instruction to the server based on the program information, the remote operation instruction being used to instruct to perform an operation on the target app running on the server; and receiving a remote operation result returned by the server, the remote operation result being a result obtained by performing the operation on the running target app, including:

sending to the server a first operation position of the operation that the remote operation instruction instructs to perform on the screen of the terminal;

determining, by the server, a second operation position that is on a screen of the server configured to display running information of the target app and corresponds to the first operation position, via acquiring a second resolution of the screen of the server and determining a width and a height of coordinates corresponding to the second operation position according to the first resolution, the second resolution, and the first operation position; and performing, by the server, the operation on the second operation position on the screen of the server.

13. The terminal according to claim 12, wherein the sending the remote operation instruction to the server based on the program information comprises:

displaying the program information on the screen of the terminal;

detecting the operation performed at the first operation position of the screen of the terminal;

generating the remote operation instruction, wherein the remote operation instruction indicates the first operation position and the operation; and sending the remote operation instruction to the server.

14. The terminal according to claim 12, wherein the processor is further configured to perform:

displaying initial state information on a screen of the terminal; and displaying a measured time duration on the screen of the terminal in a floating manner, or displaying the measured time duration embedded in the initial state information.

15. The terminal according to claim 12, wherein the processor is further configured to perform:

receiving operation end information sent by the server, wherein the operation end information is used to instruct the server to stop responding to the remote operation instruction sent by the terminal.

16. A server for app processing, comprising: a memory; and a processor coupled to the memory and configured to perform:

receiving a remote operation request sent by a terminal, the remote operation request including a first resolution of a screen of the terminal and being used to request to perform a remote operation on a target app to be downloaded on an app platform, and the target app having not been installed on the terminal;

after running the target app in response to the remote operation request, returning program information of the target app to the terminal, the target app being installed on the server;

receiving a remote operation instruction sent by the terminal based on the program information, the remote operation instruction being used to instruct to perform an operation on the target app running on the server; and performing the operation on the running target app to obtain a remote operation result, and returning the remote operation result to the terminal, including:

acquiring a first operation position of the operation that the remote operation instruction instructs to perform on the screen of the terminal;

determining a second operation position that is on a screen of the server configured to display running information of the target app and corresponds to the first operation position, via acquiring a second resolution of the screen of the server and determining a width and a height of coordinates corresponding to the second operation position according to the first resolution, the second resolution, and the first operation position; and performing the operation on the second operation position on the screen of the server.

* * * * *